US008961860B2

(12) United States Patent
Eriksson et al.

(10) Patent No.: US 8,961,860 B2
(45) Date of Patent: Feb. 24, 2015

(54) LASER BUILD UP METHOD USING VIBRATION AND APPARATUS

(75) Inventors: Jonas Eriksson, Finspong (SE); Ulf Simmons, Norrkoping (SE)

(73) Assignee: Siemens Aktiengesellschaft, München (DE)

( * ) Notice: Subject to any disclaimer, the term of this patent is extended or adjusted under 35 U.S.C. 154(b) by 258 days.

(21) Appl. No.: 13/404,345

(22) Filed: Feb. 24, 2012

(65) Prior Publication Data

US 2012/0223462 A1    Sep. 6, 2012

(30) Foreign Application Priority Data

Mar. 1, 2011  (EP) .................................... 11156368

(51) Int. Cl.
*B29C 41/02*      (2006.01)
*B22F 3/105*      (2006.01)
*B22F 7/06*       (2006.01)

(52) U.S. Cl.
CPC ............... *B22F 3/1055* (2013.01); *B22F 7/062* (2013.01); *B22F 2003/1056* (2013.01)
USPC .......................................... 264/497; 264/308

(58) Field of Classification Search
USPC .......................................... 264/497, 308, 401
See application file for complete search history.

(56) References Cited

U.S. PATENT DOCUMENTS

| 4,300,474 | A | * | 11/1981 | Livsey | 118/641 |
| 4,323,756 | A | * | 4/1982 | Brown et al. | 219/121.66 |
| 4,644,127 | A | * | 2/1987 | La Rocca | 219/121.84 |
| 5,204,055 | A | * | 4/1993 | Sachs et al. | 419/2 |
| 6,682,688 | B1 | | 1/2004 | Fuwa et al. | |
| 2002/0152002 | A1 | * | 10/2002 | Lindemann et al. | 700/119 |
| 2004/0099983 | A1 | * | 5/2004 | Dirscherl | 264/162 |
| 2011/0217457 | A1 | | 9/2011 | Huttner et al. | |

FOREIGN PATENT DOCUMENTS

DE    102008056336 A1    5/2010

OTHER PUBLICATIONS

Gedda, H., et al., Melt-Solid Interactions in Laser Cladding and Laser Casting, Metallurgical and Materials Transactions B, vol. 36B (Oct. 2005), pp. 683-689.*
Sexton, L., et al., Laser cladding of aerospace materials, Journal of Materials Processing Technology, vol. 122 (2002), pp. 63-68.*

* cited by examiner

*Primary Examiner* — Matthew Daniels

(57) ABSTRACT

A laser built up method on an object with different surfaces is provided. The object can be coated locally, which is not possible by the conventional rapid prototyping processes. The object is put into a powder bed, powder is provided on or near the object and the powder is only locally provided on the upper outer surface of the object and then densified.

11 Claims, 3 Drawing Sheets

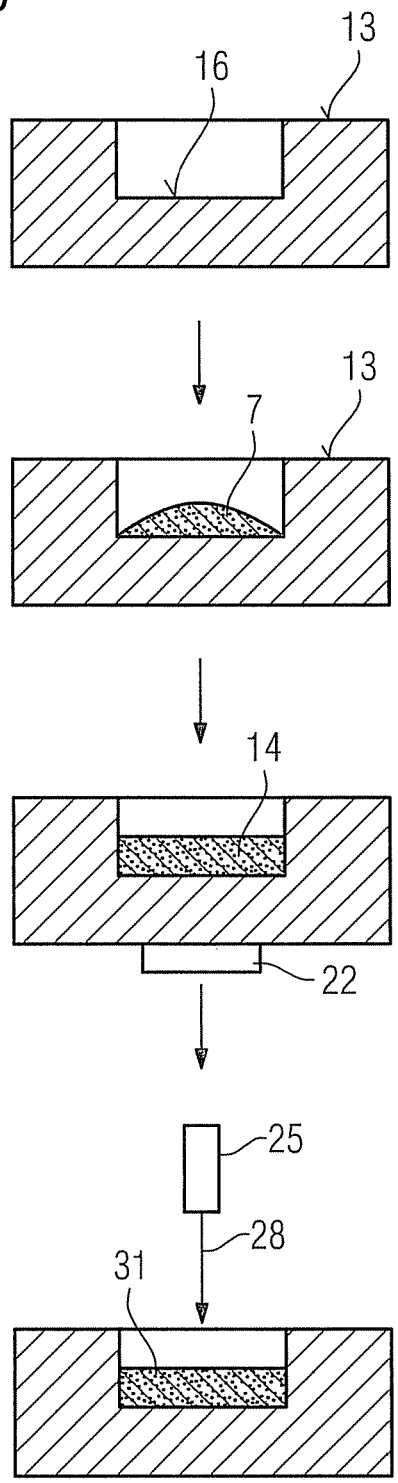

LASER BUILD UP METHOD USING VIBRATION AND APPARATUS

CROSS REFERENCE TO RELATED APPLICATIONS

This application claims priority of European Patent Office application No. 11156368.0 EP filed Mar. 1, 2011. All of the applications are incorporated by reference herein in their entirety.

FIELD OF INVENTION

The invention relates to a laser build-up method using vibration for powder filling and an apparatus.

BACKGROUND OF INVENTION

Selective Laser Melting is a relatively well known and modern method of creating parts and components from powder material. A machine used together with this method comprises a table or building platform on which the part is built. Layer by layer after the leading of a layer of powder which is molten by a laser beam. The layer thickness is created by a scraper that moves over the powder bed. One major requirement for the functionality of the machine is that the object does not contain any obstacle sticking out upwards from the powder bed. This implies that only part with a flat upper surface can be used. This is generally no problem when parts are built from "scratch" but any application including repairing of existing objects will need a preceding operation where the object is machined in such a way that the top surface is flat.

The selective laser melting in its current known form is limited to planar horizontal surfaces and where the component can be retracted downward for each sintered layer.

There are a number of processes available for depositing material to components by sintering metallic powder by laser. These methods varies slightly and can be divided into laser cladding, where powder is fed to the melting area and melted by a laser beam that can move in multiple axis and Laser Sintering where the powder is resident in a powder bed and the laser beam is oriented top down.

Laser cladding has a low yield in terms of supplied powder and the deposit rate on the substrate is limited.

SUMMARY OF INVENTION

Therefore it is the aim of the invention to overcome the above described problems.

The problem is solved by a method according to the claims.

The invention describes methods for how powder distribution and layer thickness control can be applied to objects by locally applying powder or by vibration.

In the dependent claims further advantageous features are listed, which can be combined arbitrarily with each other to yield further advantages.

BRIEF DESCRIPTION OF THE DRAWINGS

FIGS. 1 to 9 show steps of the inventive method.
The figures and the description are only examples of the invention.

DETAILED DESCRIPTION OF INVENTION

Figure 1:
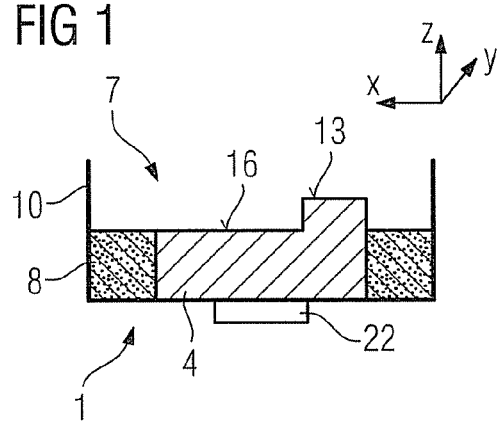

FIG. 1 shows an exemplary apparatus 1 to perform this method.

The apparatus 1 comprises especially a container 10 wherein powder 7 (as arrow) or a powder bed 8 and an object 4 to be coated is present.

Figure 3:
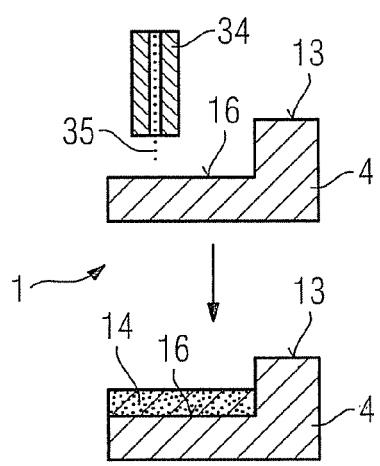

There is no need for having a container or powder bed (see FIG. 3, 9).

The object 4 has especially several upper surfaces 13, 16 on one side, wherein only the lower upper surface 16 shall preferably be coated. But the invention is not limited to non planar surfaces.

Figure 2:
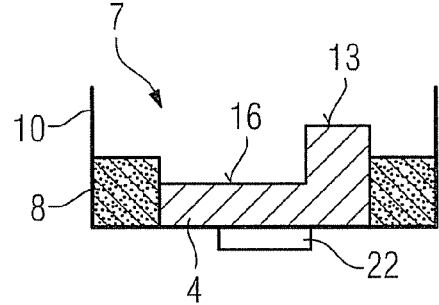

The object 4 is retracted so that height of the powder bed 8 is higher than the surface 16 (FIG. 2).

Figure 4:
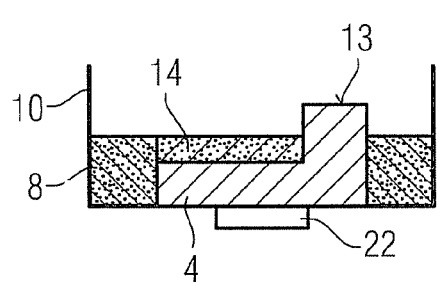

By using vibration means 22 powder 7 is filled and distributed on the surface 16 for getting a powder layer 14 (FIG. 4).

The powder 7, 8 is supplied to the apparatus 1 and by vibration the powder flows easily over one surface 16 of the object 4.

The vibration means 22 can be attached directly to the object 4 and/or the container 10. Even several vibration means 22 can be used at different locations (object 4, container 10).

An alternative is to use a powder supply 34 with supplies powder 35 on the surface 16 (FIG. 3). The powder supply 34 is preferably moved over the surface 16. The powder 35 is preferably only locally applied. In this case no powder bed or container is necessary.

Also vibration means 22 can be used to densify or to homogenize the powder.

Especially there is a level control that makes sure that there is enough powder in the apparatus 1. If the powder level is too low, additional powder is fed in and the apparatus 1 is re-vibrated to let the powder flow freely and being distributed over the wanted surface 16.

There can be a tool 31 (FIG. 5) which applied to FIG. 3 or FIG. 4 to remove or push aside excess powder from the areas where the laser beam 28 is supposed not to melt. The thickness of the powder layer 14 may reach the desired value by vibration only (FIG. 4). The tool (31 in FIG. 5 or 34 in FIG. 3) is preferably taking care of this as it moves over the surface 16 to be coated and pushes aside all excess powder. This function resembles the scraper as it forms a layer with a predefined and controlled thickness but unlike the scraper which usually travels in one direction only the whole width of the apparatus along the X-axis this tool (34 or 31) travels along any desired path over the surface 16 in both X and Y directions and this path avoids the obstacle surface 13.

Figure 5:
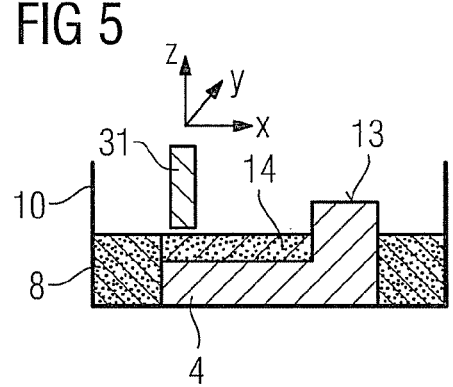
Figure 6:
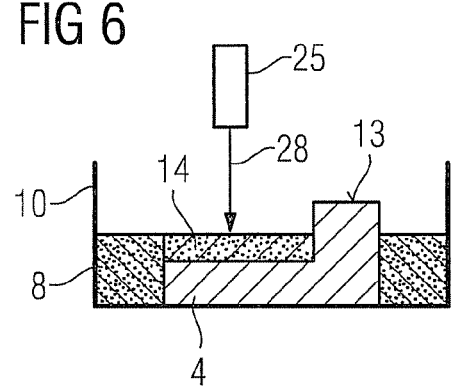

After having completed the supply of powder for one layer, in the next step (FIG. 6) a laser beam 8 of a laser 25 or electron beams are used to densify especially to sinter or to melt the powder layer 14 of FIG. 3, 4 or 5.

The densification can also preferably be locally (FIG. 4, 5, 6, 8, 9).

Figure 7:
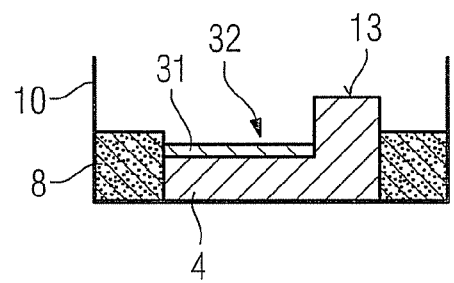
Figure 8:
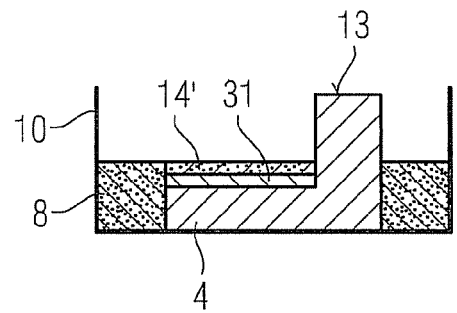

In the next step the object 4 can be again retracted, so that the level of powder bed 8 is higher than the densified layer 31 (FIG. 7) and no powder or empty space 32 is present above the layer 31.

The object 4 or the container 10 is put into vibration and a second powder layer 14' is filled on the object 4 or as described in FIG. 3 (by powder supplier), 4 or 5.

This can be repeated to build up several layers.

This method can be used to repair components and can especially be performed locally.

The method requires an apparatus 1 for laser sintering or melting powder and comprises especially a horizontal powder bed 8 that especially gradually retracts especially downward as each layer is built up. Each powder layer is densified by a laser beam sweeping over the powder layer 14 and densifying the powder and attaching powder to a previous layer. The downward movement of the powder bed 8 can be programmed to increments of a millimeter and can especially correspond to the size of the powder particles.

Conventional Selective Laser Sintering Machines has a scraper which for each layer must be swept over the whole upper surface (here 13, 16) pushing powder material in front of the scraper and creating a layer of powder.

The invention does not use the scraper but a cylindrical tool on X and Y guides with the movement similar to a milling machine FIG. 9 shows another example of the method.

The lower upper surface 16 is totally surrounded by the upper surface 13.

In this groove a powder 7 is supplied which is in most cases nonuniformly distributed. A powder supply does not have to move over the surface 16. By vibration means 22 the powder 7 is distributed uniformly inside the groove forming a powder layer 14.

After that a laser 25 with laser beams 28 is used to densify the powder layer 14 to get a dense layer 31, wherein the powder layer 14 can preferably only locally be densified.

In FIG. 9 the container and the powder bed is not shown or not necessary and even the vibration means are not shown all over the several steps of FIG. 4.

A CNC program is preferably used for moving and controlling the object 4, the laser 25 or other tools (in all figures).

The invention uses a robust tool with that may get in contact with the object if the object for same reason has been deflected by heat or strain. This feature can in some cases readjust the object and remove burrs and spatters.

The invention expands Selective Laser Melting to cover also non planar object found typically in all repair businesses.

The advantage of the invention are that it is now possible to limit the Selective Laser Melting to an area that does not have to be plane and to selective areas of an object that does not have a planar upper surface and lead to a reduction of operating time of the apparatus 1.

We claim:

1. A laser build up method on a surface of an object, comprising:
    providing powder on or near the object having an upper outer surface comprising two or more non planar surfaces with different heights and including a lower upper outer surface and an upper outer surface;
    retracting the object such that the height of the object is lower than the powder;
    supplying or distributing the powder only locally on the upper outer surface of the object;
    moving a tool is two directions over the powder to machine the powder; and
    densifying the powder using a laser,
    wherein only the lower upper outer surface is built up.

2. The method according to claim 1, wherein the powder is only locally densified.

3. The method according to claim 1, further comprising putting the object into a powder bed.

4. The method according to claim 1, wherein the object is put directly or indirectly into vibration.

5. The method according to claim 1, wherein a powder supply is used to provide powder on the object.

6. The method according to claim 1, wherein the laser is used to melt the powder.

7. The method according to claim 1, wherein the tool is moved over the powder layer to get a uniform thickness of the powder layer.

8. A laser build up method on a surface of an object, comprising:
    providing powder on or near the object which has several non-planar upper surfaces of different heights on one side of the object;
    putting the object directly or indirectly into vibration, so that powder fills only the lower surface of the non-planar upper surfaces of the object to form a powder layer;
    moving a tool over the powder in two directions to machine the powder layer in order to form a uniform thickness powder layer; and
    densifying the uniform thickness powder layer by melting the powder with a laser,
    wherein only the lower surface of the non-planar upper surfaces of the object is built up.

9. The method as claimed in claim 8, further comprising putting the object into a powder bed.

10. The method as claimed in claim 8, wherein the powder is only locally densified.

11. The method according to claim 8, wherein a powder supply is used to provide powder on the object.

\* \* \* \* \*